(12) United States Patent
Kohno (10) Patent No.: US 6,373,638 B1
(45) Date of Patent: Apr. 16, 2002

(54) IMAGE TAKING OPTICAL SYSTEM AND REDUCTION OPTICAL SYSTEM

(75) Inventor: Tetsuo Kohno, Osaka (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/419,896

(22) Filed: Oct. 18, 1999

(30) Foreign Application Priority Data

Oct. 20, 1998 (JP) ............................................. 10-297928

(51) Int. Cl.⁷ .............................................. G02B 15/02
(52) U.S. Cl. ...................................... 359/675; 359/672
(58) Field of Search ................................. 359/672, 673, 359/674, 675

(56) References Cited

U.S. PATENT DOCUMENTS

| 4,264,151 A | * | 4/1981 | Okano | ......................... | 359/675 |
| 4,867,549 A | | 9/1989 | Sekine | ......................... | 359/431 |
| 5,680,249 A | | 10/1997 | Ishikawa et al. | ............. | 359/434 |
| 5,703,716 A | | 12/1997 | Furuta | ......................... | 359/431 |

FOREIGN PATENT DOCUMENTS

| JP | 61-210312 | 9/1986 |
| JP | 63-205626 | 8/1988 |
| JP | 7-253537 | 10/1995 |
| JP | 8-114742 | 5/1996 |

\* cited by examiner

*Primary Examiner*—Georgia Epps
*Assistant Examiner*—David N. Spector
(74) *Attorney, Agent, or Firm*—Burns, Doane, Swecker & Mathis, LLP (57) ABSTRACT

A reduction optical system for reducing an image without re-forming the image formed by a main optical system, such as a zoom lens system, wherein the lens having the strongest positive optical power within the reduction optical system satisfies the following conditions:

$-2.5 < (rP1-rP2)/(rP1+rP2) < -0.3$, and $1.2 < \phi P/\phi s < 5.0$, where rP1 represents the radius of curvature on the object side of the positive lens, rP2 represents the radius of curvature on the image side of the positive lens, $\phi P$ represents the optical power of the positive lens, and $\phi s$ represents the optical power of the total system of the reduction optical system.

18 Claims, 5 Drawing Sheets

FIG. 4(a)
FNO=4.10
(W)
— d
---- SC
SPHERICAL ABERRATION / SINE CONDITION

FIG. 4(b)
Y'=9.6
---- DM
— DS
ASTIGMATISM

FIG. 4(c)
Y'=9.6
DISTORTION %

FIG. 4(d)
FNO=4.87
(M)
— d
---- SC
SPHERICAL ABERRATION / SINE CONDITION

FIG. 4(e)
Y'=9.6
---- DM
— DS
ASTIGMATISM

FIG. 4(f)
Y'=9.6
DISTORTION %

FIG. 4(g)
FNO=5.77
(T)
— d
---- SC
SPHERICAL ABERRATION / SINE CONDITION

FIG. 4(h)
Y'=9.6
---- DM
— DS
ASTIGMATISM

FIG. 4(i)
Y'=9.6
DISTORTION %

FIG. 6(a)
FNO=4.65
(W)
—— d
---- SC
-0.2  0.2
SPHERICAL SINE
ABERRATION CONDITION

FIG. 6(b)
Y'=9.6
---- DM
—— DS
-0.2  0.2
ASTIGMATISM

FIG. 6(c)
Y'=9.6
-5.0  5.0
DISTORTION %

FIG. 6(d)
FNO=5.55
(M)
—— d
---- SC
-0.2  0.2
SPHERICAL SINE
ABERRATION CONDITION

FIG. 6(e)
Y'=9.6
---- DM
—— DS
-0.2  0.2
ASTIGMATISM

FIG. 6(f)
Y'=9.6
-5.0  5.0
DISTORTION %

FIG. 6(g)
FNO=5.85
(T)
—— d
---- SC
-0.2  0.2
SPHERICAL SINE
ABERRATION CONDITION

FIG. 6(h)
Y'=9.6
---- DM
—— DS
-0.2  0.2
ASTIGMATISM

FIG. 6(i)
Y'=9.6
-5.0  5.0
DISTORTION %

IMAGE TAKING OPTICAL SYSTEM AND REDUCTION OPTICAL SYSTEM

CROSS-REFERENCE TO RELATED APPLICATION

This application is based on Application No. 10-297928 filed in Japan, the content of which is hereby incorporated by reference.

BACKGROUND OF THE INVENTION

1. Field of the Invention

The present invention relates to an image taking optical system for cameras, and specifically relates to an image taking optical system having a reduction optical system for reducing an image via a main optical system.

2. Description of Related Art

In conjunction with the popularization of personal computers in recent years, digital still cameras for taking images which are easily stored on floppy disks and the like have become widely used. With the increasing popularity of digital still cameras, there has been demand for enlargement of the photographic range, and concomitant demand for photographic lenses of various specifications.

In the field of recording images on silver salt film, single lens reflex cameras have come to use a plurality of exchangeable taking lenses (exchangeable lenses), and there has been a corresponding demand for taking lenses of various specifications.

If exchangeable lenses for single lens reflex cameras can be used with digital still cameras using an photoelectric conversion element, it is possible to respond to the demand for such photographic lenses. A specific method, for example, arranges a direct photoelectric conversion element on the image forming plane of an exchangeable lens. Japanese Laid-Open Patent Application Nos. 63-205626, 7-253537, and 8-114742 disclose methods wherein a condenser lens is arranged near the image plane of an exchangeable lens, and a relay optical system is provided for re-forming an image formed by the exchangeable lens.

On one hand, in such methods which arrange a direct photoelectric conversion element on the image forming plane of an exchangeable lens, an extremely large photoelectric conversion element having a large number of pixels is required to obtain the full optical capabilities of the exchangeable lens. This is because the conversion element has a screen size similar to that of silver salt film. Such an photoelectric conversion element is prohibitively expensive and difficult to apply to consumer products.

On the other hand, the constructions disclosed in Japanese Laid-Open Patent Application Nos. 63-205626, 7-253537, and 8-114742 are disadvantageous inasmuch as the taking optical system is greatly enlarged so as to re-form the image formed by the exchangeable lens.

SUMMARY OF THE INVENTION

An object of the present invention is to provide an improved image taking optical system for cameras.

Another object of the present invention is to provide a compact taking optical system for cameras capable of using exchangeable lenses, and which is suitable for producing high quality images.

These objects are attained by an image taking optical system comprising a main optical system for forming an object image, and a reduction optical system for reducing an image without re-forming the image formed by the main optical system, wherein the lens having the strongest positive optical power within the reduction optical system satisfies the following conditions:

$-2.5 < (rP1-rP2)/(rP1+rP2) < -0.3$, and $1.2 < \phi P/\phi s < 5.0$, where rP1 represents the radius of curvature on the object side of the positive lens, rP2 represents the radius of curvature on the image side of the positive lens, $\phi P$ represents the optical power of the positive lens, and $\phi s$ represents the optical power of the total system of the reduction optical system.

BRIEF DESCRIPTION OF THE DRAWINGS

These and other objects and features of this invention will become clear from the following description taken in conjunction with the preferred embodiments with reference to the accompanying drawings, in which.

DETAILED DESCRIPTION OF THE PREFERRED EMBODIMENTS

Figure 1:
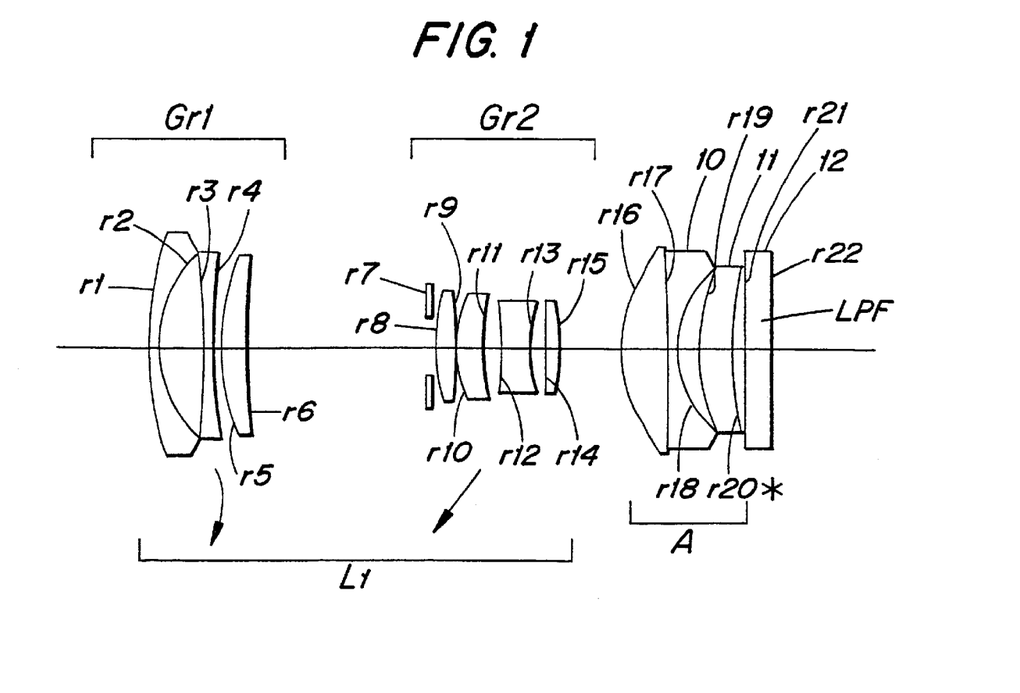
FIG. 1 shows the construction of the taking optical system of a first embodiment.
Figure 2:
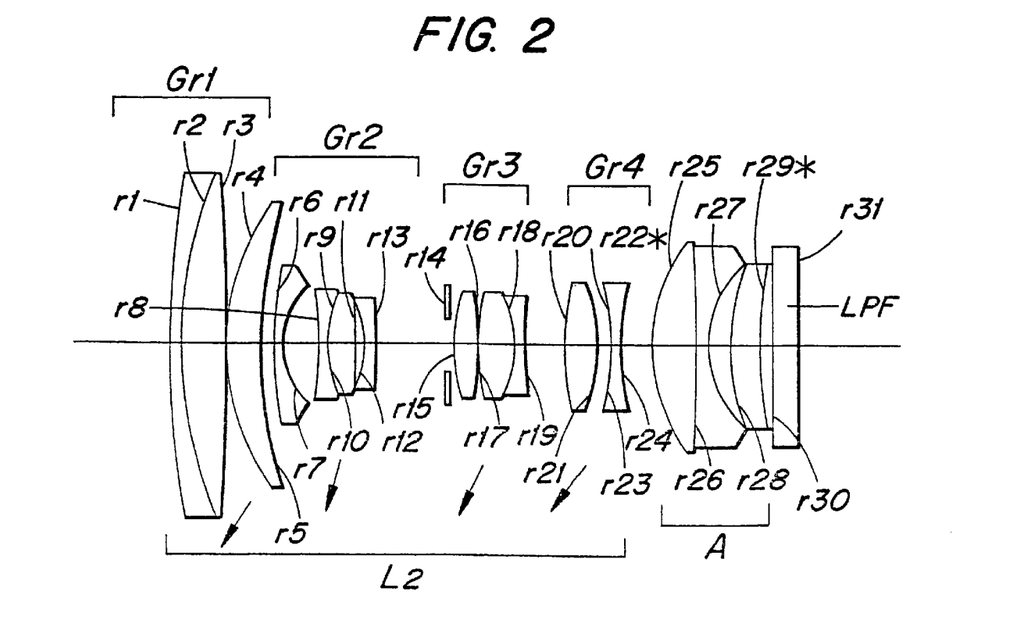
FIG. 2 shows the construction of the taking optical system of a second embodiment.
Figure 3:
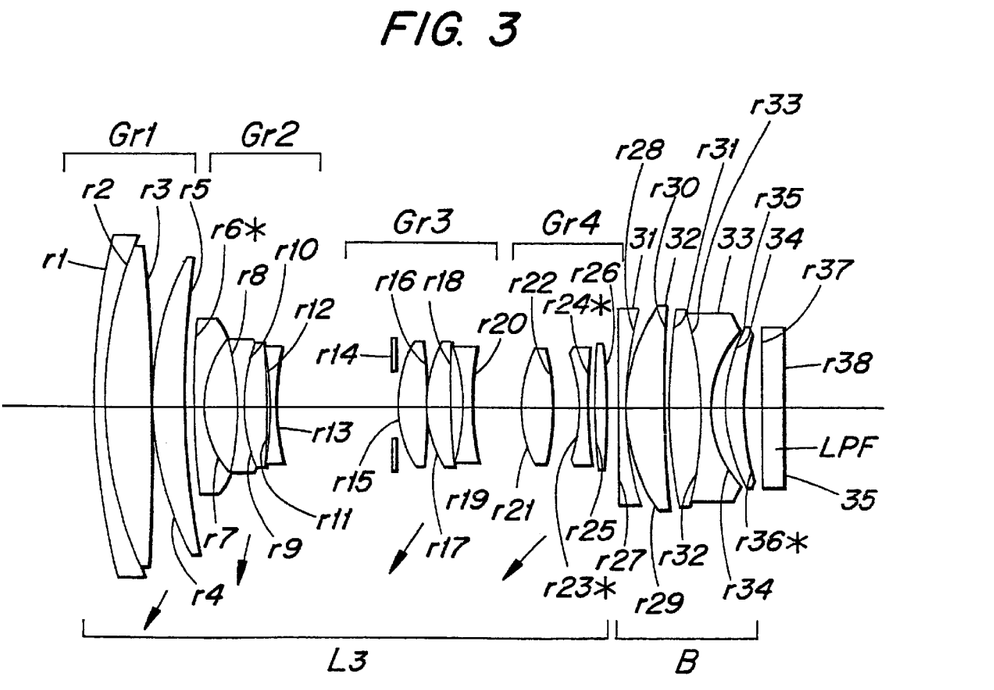
FIG. 3 shows the construction of the taking optical system of a third embodiment.
Figure 4A:
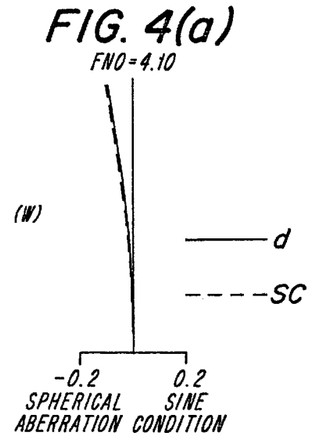
FIG. 4 is an aberration diagram at infinity corresponding to the first embodiment.
Figure 4B:
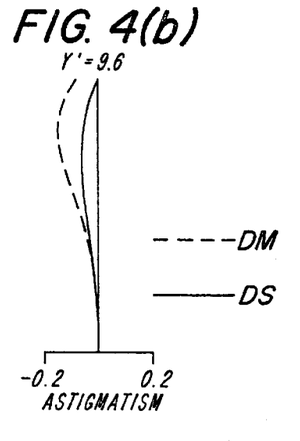
Figure 4C:
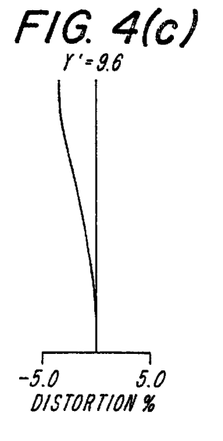
Figure 4D:
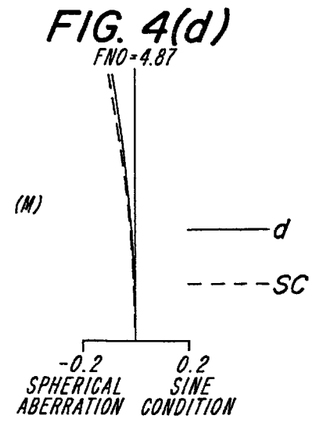
Figure 4E:
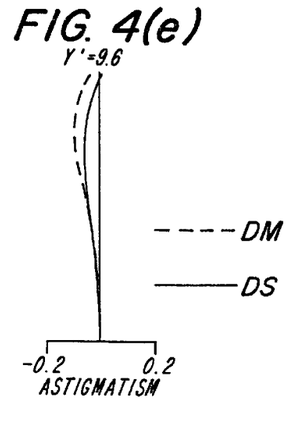
Figure 4F:
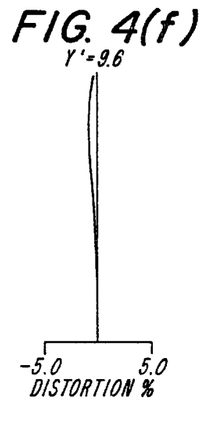
Figure 4G:
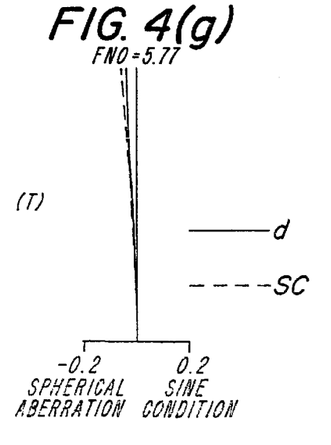
Figure 4H:
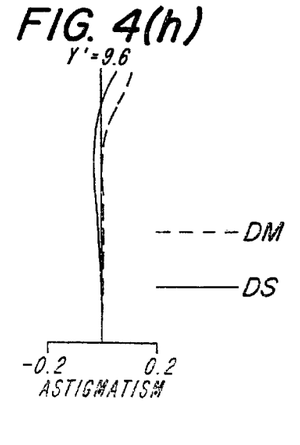
Figure 4I:
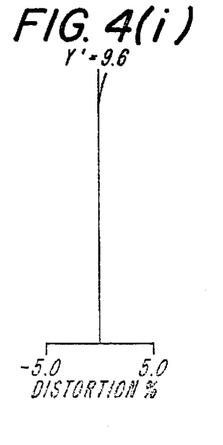
Figure 5A:
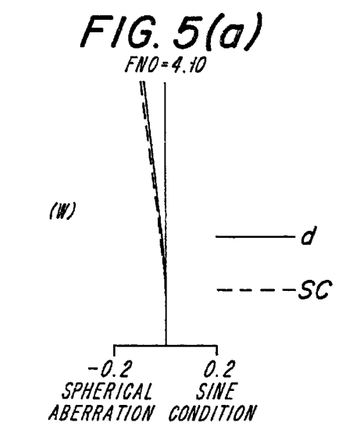
FIG. 5 is an aberration diagram at infinity corresponding to the second embodiment.
Figure 5B:
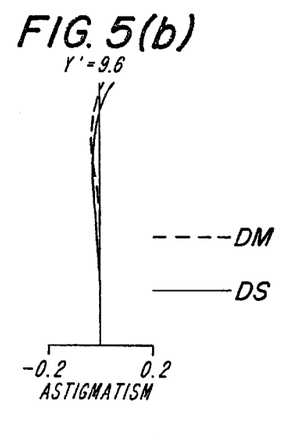
Figure 5C:
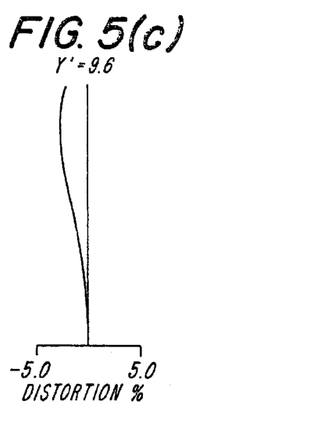
Figure 5D:
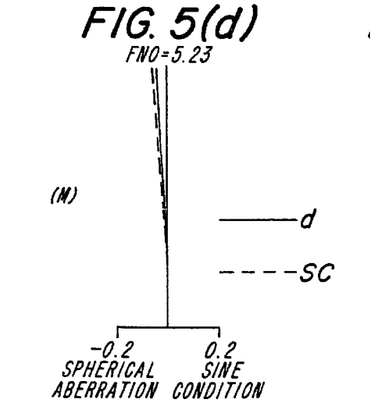
Figure 5E:
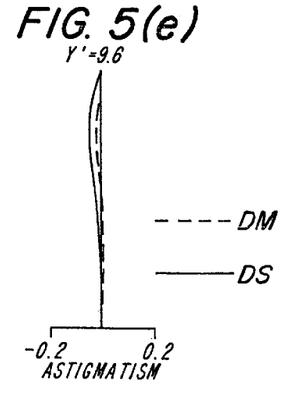
Figure 5F:
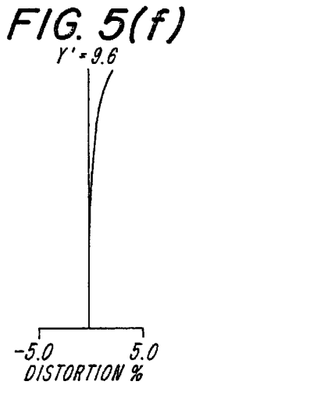
Figure 5G:
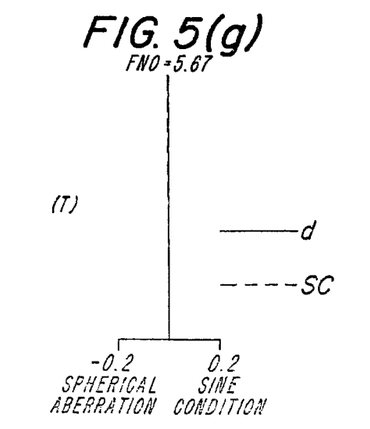
Figure 5H:
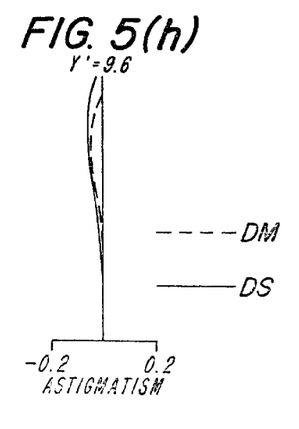
Figure 5I:
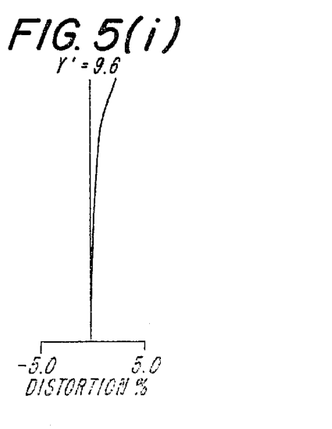
Figure 6A:
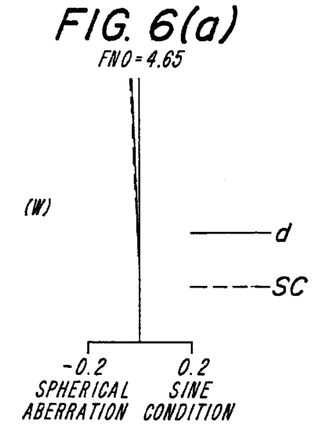
FIG. 6 is an aberration diagram at infinity corresponding to the third embodiment.
Figure 6B:
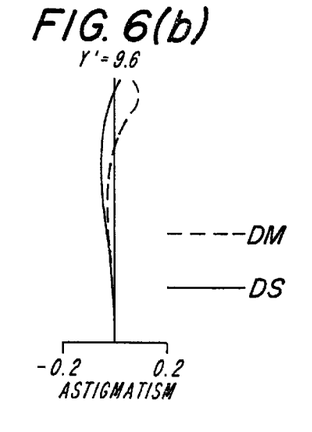
Figure 6C:
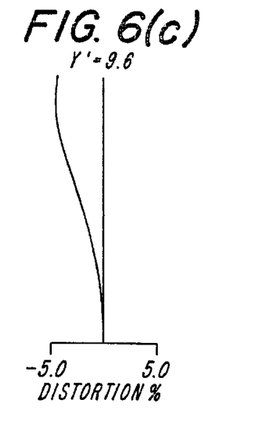
Figure 6D:
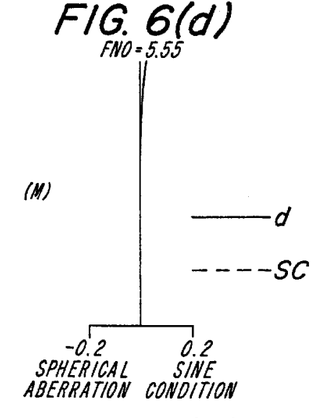
Figure 6E:
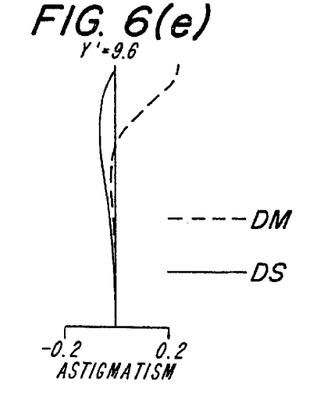
Figure 6F:
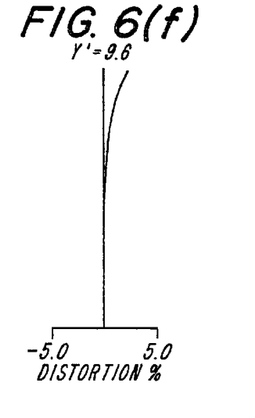
Figure 6G:
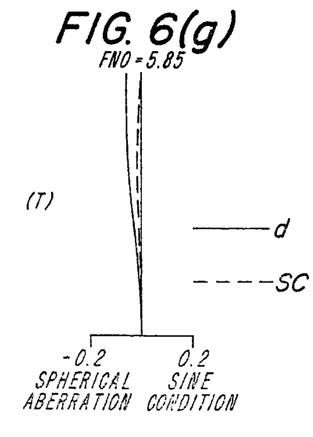
Figure 6H:
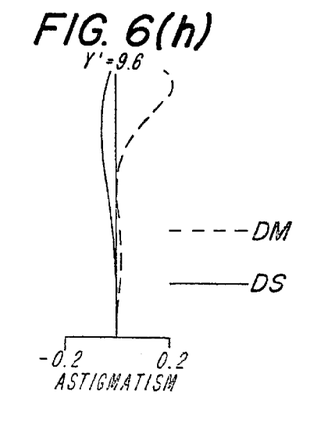
Figure 6I:
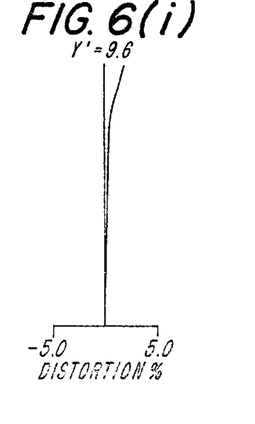

The embodiments of the present invention are described hereinafter with reference to the accompanying drawings. FIGS. 1 through 3 show the constructions of the taking optical systems of the first through the third embodiments, respectively. Arrows in the drawings schematically represent the direction of movement of each lens element during the zooming operation described later. Each drawing shows conditions at the wide angle end during zooming.

In the first embodiment shown in FIG. 1, a main optical system unit L1 is provided with a reduction optical unit A. The left side in the drawing is the object side and the right side is the image side. In the drawing, the reduction optical unit A comprises sequentially from the object side a cemented lens 10 having a biconvex lens and a biconcave lens, and a positive meniscus lens 11 having a convex surface on the object side. The parallel panel arranged on the image side of the reduction optical unit A is a low-pass filter (LPF) 12.

The main optical system unit L1 is a zoom lens comprising sequentially from the object side a first lens element Gr1 and a second lens element Gr2, wherein the first lens element Gr1 moves initially to the image side, and then moves again to the object side when zooming from the wide angle end to the telephoto end. The second lens element Gr2 moves simply to the object side as indicated by the arrows in the drawing when zooming from the wide angle end to the telephoto end.

In the second embodiment shown in FIG. 2, a main optical system unit L2 is provided with the reduction optical unit A. Similar to the first embodiment, the left side of the drawing is the object side, and the right side is the image side. In the drawing, the main optical system L2 is a zoom lens comprising sequentially from the object side a first lens element Gr1, a second lens element Gr2, a third lens element Gr3, and a fourth lens element Gr4, and all lens elements move simply to the object side as indicated by the arrows in the drawing when zooming from the wide angle side to the telephoto side.

In the third embodiment shown in FIG. 3, a main optical system unit L3 is provided with a reduction optical unit B. Similar to the first embodiment, the left side of the drawing is the object side, and the right side is the image side. In the drawing, the reduction optical unit B comprises sequentially from the object side a planoconcave lens 31 having a concave surface on the image side, a positive meniscus lens 32 having a convex surface on the object side, a cemented lens 33 having a biconvex lens and a biconcave lens, and a positive meniscus lens 34 having a convex surface on the object side. The parallel panel arranged on the image side of the reduction optical unit B is a low-pass filter (LPF) 35.

A low-pass filter is normally provided to prevent the generation of color moiré by solid state image sensing elements such as charge-coupled devices (CCD) and the like, and functions to optically cut the image information above a predetermined spatial frequency. An infrared cutting filter may be integrally formed with the low-pass filter (LPF) to cut the infrared range when a CCD is used as a solid state image sensing element.

The main optical system unit L3 is a zoom lens comprising sequentially from the object side a first lens element Gr1, a second lens element Gr2, a third lens element Gr3, and a fourth lens element Gr4, and all lens elements move simply to the object side as indicated by the arrows in the drawing when zooming from the wide angle side to the telephoto side.

The reduction optical unit A also is applicable to the main optical system unit L3, and the reduction optical unit B also is applicable to the main optical system units L1 and L2. Accordingly, each of the main optical system units are mutually exchangeable.

The reduction optical units must satisfy the following conditions. It is desirable that the lens having the strongest positive optical power in the reduction optical systems of each of the aforesaid embodiments satisfies the following conditional equation (1):

$$-2.5 < (rP1-rP2)/(rP1+rP2) < -0.3 \quad (1)$$

where rP1 represents the radius of curvature on the object side of the positive lens, and rP2 represents the radius of curvature on the image side of the positive lens.

Conditional equation (1) stipulates the shape of the lens having the greatest positive optical power. When the lower limit of conditional equation (1) is exceeded, the curvature becomes excessive on the object side, such that under side (i.e., towards the negative side of an aberration diagram) spherical aberration becomes pronounced. Conversely, when the upper limit is exceeded, the over side (i.e., towards the positive side of an aberration diagram) spherical aberration becomes excessive.

It is also desirable that the lens having the strongest positive optical power in the reduction optical systems of each embodiment satisfies the following conditional equation (2), $$1.2 < \phi P/\phi s < 5.0 \quad (2)$$

where φP represents the optical power of the positive lens, and φs represents the optical power of the total system of the reduction optical system.

Conditional equation (2) stipulates the optical power of the lens having the greatest positive optical power. When the lower limit of conditional equation (2) is exceeded, the optical power of this positive lens becomes too weak, necessitating an increase in the number of lenses elements and an increase in cost. Conversely, when the upper limit is exceeded, the optical power of the positive lens becomes excessively strong, so as to generate marked aberration of various types in the positive lens. In particular, the positive deviation of the Petzval sum becomes marked when spherical aberration falls below the underside.

It is desirable that the lens having the strongest negative power in the reduction optical system of each of the embodiments satisfies conditional equation (3) below in addition to satisfying conditional equations (1) and (2):

$$0.65 < (rN1-rN2)/(rN1+rN2) < 3.0 \quad (3)$$

where rN1 represents the radius of curvature on the object side of the negative lens, and rN2 represents the radius of curvature on the image side of the negative lens.

When the lower limit of conditional equation (3) is exceeded, the curvature becomes excessive on the object side such that the spherical aberration on the under side becomes pronounced. Conversely, when the upper limit is exceeded, the fall of the spherical aberration to the over side becomes excessive.

It is further desirable that the lens having the strongest negative optical power in the reduction optical system of the aforesaid embodiments satisfies conditional equation (4) below in addition to satisfying conditional equations (1) and (2):

$$-5.5 < \phi N/\phi s < -1.5 \quad (4)$$

where φN represents the optical power of the negative lens, and φs represents the optical power of the total system of the reduction optical system.

Conditional equation (4) stipulates the optical power of the lens having the strongest negative optical power. When the upper limit of conditional equation (4) is exceeded, the optical power of the negative lens becomes too weak, so as to make color aberration correction difficult, and preventing correction of the tendency of positive deviation of the Petzval sum. Conversely, when the lower limit is exceeded, the optical power of the negative lens becomes excessive, and the generation of various aberrations in the negative lens becomes marked. In particular, the positive deviation of the Petzval sum becomes marked when spherical aberration falls to the over side.

It is further desirable that the reduction optical system of the aforesaid embodiments satisfies conditional equation (5) below:

$$0.4 < \beta s < 0.9 \quad (5)$$

where βs represents the lateral magnification of the reduction optical system.

Conditional equation (5) stipulates the magnification of the reduction optical system. When the lower limit of conditional equation (5) is exceeded, the magnification is reduced, so as to require stronger optical power for the reduction optical system. Although the camera is effectively made more compact due to the reduced size of the screen of the photoelectric conversion element arranged at the image forming plane, the stronger optical power adversely affects various aberrations, and especially the magnification color aberration and positive deviation of the Petzval sum become pronounced so as to make it difficult to ensure back focus. Conversely, although aberration correction is enhanced when the upper limit is exceeded, the camera becomes larger due to the increased size of the screen of the photoelectric conversion element.

It is desirable that the reduction optical system of the aforesaid embodiments satisfies conditional equation (6):

$$1.2 < fs(1-\beta s)/Ys < 4.0 \tag{6}$$

where fs represents the focal length ($=1\phi s$) of the reduction optical system, and Ys represents the maximum image height of the photographic lens and the reduction optical system.

Conditional equation (6) stipulates ratio between the maximum image height on the photoelectric conversion element arranged at the image forming plane, and the object distance of the reduction optical system, and stipulates the relationship between magnification and the focal length of the reduction optical system in accordance with the applied main optical system and the screen size of the photoelectric conversion element. When the lower limit of conditional equation (6) is exceeded, the back focus becomes short in correspondence with the main optical system, and positive deviation of the Petzval sum and magnification color aberration become marked due to the reduced focal length, i.e., the increased optical power, of the reduction optical system. Conversely, when the upper limit is exceeded, the back focus becomes long in correspondence with the main optical system, so as to unnecessarily lengthen the back focus of the reduction optical system and enlarge the camera due to the lengthened focal length, i.e., the reduced optical power, of the reduction optical system.

It is desirable that the reduction optical system of the aforesaid embodiments satisfies conditional equation (7):

$$3.0 < fs/Ys < 11.0 \tag{7}$$

Conditional equation (7) stipulates the focal length of the reduction optical system. When the lower limit of conditional equation (7) is exceeded, there is marked positive deviation of the Petzval; sum and magnification color aberration. Conversely, when the upper limit is exceeded, the back focus of the reduction optical system becomes longer than necessary, thereby enlarging the camera and making it difficult to ensure the required reduction magnification.

It is desirable that the reduction optical system of the aforesaid embodiments satisfies conditional equation (8):

$$3.5 < Ein/Ys < 10.5 \tag{8}$$

where Ein represents the distance from the exit pupil position of the main optical system to the first surface of the reduction optical system.

Conditional equation (8) stipulates the exit pupil position of the main optical system used. When the lower limit of conditional equation (8) is exceeded, the exit pupil position is very near the main optical system, and the image plane falls to the over side producing pronounced barrel distortion. Conversely, when the upper limit is exceeded, the exit pupil position is extremely far from the main optical system, causing the image plane to fall to the object side, and producing extreme pin-cushion distortion.

When an aspherical surface is used in the reduction optical system, it is desirable that conditional equation (9) is satisfied:

$$-0.65 < (X-X0)/(N'-N) < 0 \tag{9}$$

Where X represents the displacement in the optical axis direction at height Y of the effective optical path diameter expressed in equation (a) below, X0 represents the displacement in the optical axis direction at height Y of the effective optical path diameter expressed by equation (b) below, N' represents the refractive index of the aspherical surface on the image side, and N represents the refractive index of the aspherical surface on the object side. The equations below express the surface shape of the aspherical surface described later.

Conditional equation (9) stipulates the shape of the aspherical surface to reduce the positive optical power of the reduction optical system, and is a condition which suitably corrects image surface curvature and distortion. When the lower limit of conditional equation (9) is exceeded, image plane curvature falls to the over side and there is a marked tendency of pin-cushion distortion. Conversely, when the upper limit is exceeded, image plane curvature falls to the under side and there is a marked tendency of barrel distortion. When a plurality of aspherical surfaces are used, the other aspherical surfaces combine other aberrations regardless of whether or not conditional equation (9) is satisfied.

The structure of the taking optical system of the present invention is described below by way of specific examples with construction data and aberration diagrams. The first through the third examples correspond to the previously described first through the third embodiments, and the lens structural diagrams (FIGS. 1~3) showing the first through the third embodiments respectively show the lens structures of the first through the third examples corresponding therewith.

In the examples, the reference symbol ri (i=1,2,3 . . . ) represents the radius of curvature of the No. i surface counting from the object side, di (i=1,2,3 . . . ) represents the axial distance of the No. i surface counting from the object side, Ni (i=1,2,3 . . . ) and vi (i=1,2,3 . . . ) respectively represent the refractive index on the d-line and the Abbe No. of the No. i lens counting from the object side. In each example, the focal length of the main optical system, the total system focal length f, the total system F-number FNO, the spacing between the first lens element and the second lens element, the spacing between the second lens element and the third lens element, the spacing between the third lens element and the fourth lens element, and the spacing between the last lens element of the main optical system unit and the reduction optical system correspond sequentially from the left to values at the wide angle end (W), intermediate focal length (M), and telephoto end (T). In each example, surfaces marked by an asterisk (*) appended to the radius of curvature are aspherical surfaces, and the equations expressing the surface shape of the aspherical surfaces are defined below:

$$X = X0 + \Sigma Ai\ Y^2 \tag{a}$$

$$Xo = CY^2/\{1 + (1 - \epsilon C^2 Y^2)^{1/2}\} \tag{b}$$

where X represents the displacement from a reference surface in the optical axis direction, Y represents the height in a direction perpendicular to the optical axis, C represents the paraxial curvature, $\epsilon$ represents the secondary curvature parameter, and Ai represents the aspherical coefficient of the i order.

| Embodiment 1 | |
|---|---|
| L1 = 28.8 mm~39.6 mm~54.4 mm | Focal length of main optical system |
| f = 18.9 mm~25.9 mm~35.7 mm | Focal length of total optical system |
| FNO = 4.1~4.87~5.77 | F number |
| A = 0.655 mm | Focal length of Reduction optical system |

| [Radius of Curvature] | [Axial Distance] | [Refractive Index (Nd)] | [Abbe Number (νd)] |
|---|---|---|---|
| r1 = 43.616 | | | |
| | d1 = 1.400 | N1 = 1.67003 | ν1 = 47.15 |
| r2 = 16.000 | | | |
| | d2 = 6.100 | | |
| r3 = −89.833 | | | |
| | d3 = 1.200 | N2 = 1.74400 | ν2 = 44.93 |
| r4 = 90.321 | | | |
| | d4 = 1.100 | | |
| r5 = 29.006 | | | |
| | d5 = 3.200 | N3 = 1.70055 | ν3 = 30.11 |
| r6 = 125.790 | | | |
| | d6 = 24.105~11.294~2.000 | | |
| r7 = ∞ (diaphragm) | | | |
| | d7 = 1.000 | | |
| r8 = 32.893 | | | |
| | d8 = 2.400 | N4 = 1.69100 | ν4 = 54.75 |
| r9 = −68.245 | | | |
| | d9 = 0.150 | | |
| r10 = 16.011 | | | |
| | d10 = 3.500 | N5 = 1.62280 | ν5 = 56.88 |
| r11 = 34.207 | | | |
| | d11 = 2.300 | | |
| r12 = −108.225 | | | |
| | d12 = 4.000 | N6 = 1.80518 | ν6 = 25.43 |
| r13 = 15.185 | | | |
| | d13 = 2.100 | | |
| r14 = 161.817 | | | |
| | d14 = 2.000 | N7 = 1.63980 | ν7 = 34.55 |
| r15 = −25.266 | | | |
| | d15 = 8.545~16.053~26.472 | | |
| r16 = 19.570 | | | |
| | d16 = 6.424 | N8 = 1.82999 | ν8 = 41.82 |
| r17 = −259.308 | | | |
| | d17 = 1.500 | N9 = 1.66132 | ν9 = 29.01 |
| r18 = 13.595 | | | |
| | d18 = 2.954 | | |
| r19 = 26.640 | | | |
| | d19 = 4.108 | N10 = 1.48749 | ν10 = 70.44 |
| r20* = 80.622 | | | |
| | d20 = 1.590 | | |
| r21 = ∞ | | | |
| | d21 = 3.400 | N11 = 1.51680 | ν11 = 64.20 |
| r22 = ∞ | | | |

[Aspherical coefficient of 20th surface (r20)]

$\epsilon = 0.10000 \times 10$
$A4 = 0.15479 \times 10^{-4}$
$A6 = -0.22815 \times 10^{-6}$
$A8 = 0.31520 \times 10^{-8}$

| Embodiment 2 | |
|---|---|
| L1 = 22.5 mm~50.5 mm~78.0 mm | Focal length of main optical system |
| f = 14.7 mm~33.1 mm~51.1 mm | Focal length of entire optical system |
| FNO = 4.1~5.23~5.67 | F number |
| A = 0.655 mm | Focal length of Reduction optical system |

| [Radius of Curvature] | [Axial Distance] | [Refractive Index (Nd)] | [Abbe Number (νd)] |
|---|---|---|---|
| r1 = 138.245 | | | |
| | d1 = 1.300 | N1 = 1.83350 | ν1 = 21.00 |
| r2 = 54.039 | | | |
| | d2 = 6.090 | N2 = 1.58913 | ν2 = 61.11 |
| r3 = −242.248 | | | |
| | d3 = 0.100 | | |
| r4 = 30.432 | | | |
| | d4 = 4.500 | N3 = 1.75450 | ν3 = 51.57 |
| r5 = 61.106 | | | |
| | d5 = 1.870~14.942~22.023 | | |
| r6 = 50.477 | | | |
| | d6 = 1.000 | N4 = 1.83400 | ν4 = 37.05 |
| r7 = 10.300 | | | |
| | d7 = 4.800 | | |
| r8 = −37.077 | | | |
| | d8 = 1.000 | N5 = 1.75450 | ν5 = 51.57 |
| r9 = 19.409 | | | |
| | d9 = 0.210 | | |
| r10 = 16.272 | | | |
| | d10 = 3.700 | N6 = 1.79850 | ν6 = 22.60 |
| r11 = −42.917 | | | |
| | d11 = 0.917 | | |
| r12 = −16.998 | | | |
| | d12 = 1.300 | N7 = 1.69680 | ν7 = 56.47 |
| r13 = −83.356 | | | |
| | d13 = 9.767~4.197~1.780 | | |
| r14 = ∞ (diaphragm) | | | |
| | d14 = 0.800 | | |
| r15 = 24.573 | | | |
| | d15 = 3.200 | N8 = 1.61720 | ν8 = 54.00 |
| r16 = −28.989 | | | |
| | d16 = 0.100 | | |
| r17 = 28.797 | | | |
| | d17 = 4.800 | N9 = 1.51680 | ν9 = 64.20 |
| r18 = −12.357 | | | |
| | d18 = 1.339 | N10 = 1.80741 | ν10 = 31.59 |
| r19 = 105.532 | | | |
| | d19 = 5.400~1.669~1.089 | | |
| r20 = 28.973 | | | |
| | d20 = 4.760 | N11 = 1.58267 | ν11 = 46.43 |
| r21 = −19.633 | | | |
| | d21 = 1.588 | | |
| r22* = −167.579 | | | |
| | d22 = 0.040 | N12 = 1.51790 | ν12 = 52.31 |
| r23 = −167.579 | | | |
| | d23 = 1.400 | N13 = 1.80741 | ν13 = 31.59 |
| r24 = 29.320 | | | |
| | d24 = 4.180~17.541~22.191 | | |
| r25 = 19.570 | | | |
| | d25 = 6.424 | N14 = 1.82999 | ν14 = 41.82 |
| r26 = −259.308 | | | |
| | d26 = 1.500 | N15 = 1.66132 | ν15 = 29.01 |
| r27 = 13.595 | | | |
| | d27 = 2.954 | | |
| r28 = 24.640 | | | |
| | d28 = 4.108 | N16 = 1.48749 | ν16 = 70.44 |
| r29* = 80.622 | | | |
| | d29 = 1.590 | | |
| r30 = ∞ | | | |
| | d30 = 3.400 | N17 = 1.51680 | ν17 = 64.20 |
| r31 = ∞ | | | |

[Aspherical coefficient of 22nd surface (r22)]

$\epsilon = 0.10000 \times 10$
$A4 = -0.11449 \times 10^{-3}$
$A6 = -0.40063 \times 10^{-6}$
$A8 = 0.19296 \times 10^{-11}$
$A10 = -0.80550 \times 10^{-11}$
$A12 = 0.60989 \times 10^{-13}$

[Aspherical coefficient of 29th surface (r29)]

$\epsilon = 0.10000 \times 10$
$A4 = 0.15479 \times 10^{-4}$
$A6 = -0.22815 \times 10^{-6}$
$A8 = 0.31520 \times 10^{-8}$

| Embodiment 3 | | | |
|---|---|---|---|
| L1 = 22.5 mm~60.0 mm~156.0 mm | | Focal length of main optical system | |
| f = 14.7 mm~39.3 mm~102.1 mm | | Focal length of entire optical system | |
| FNO = 4.65~5.55~5.85 | | F number | |
| A = 0.655 mm | | Focal length of Reduction optical system | |
| [Radius of Curvature] | [Axial Distance] | [Refractive Index (Nd)] | [Abbe Number (vd)] |
| r1 = 92.166 | | | |
| | d1 = 1.400 | N1 = 1.83350 | v1 = 21.00 |
| r2 = 56.497 | | | |
| | d2 = 6.150 | N2 = 1.49310 | v2 = 83.58 |
| r3 = −319.060 | | | |
| | d3 = 0.100 | | |
| r4 = 39.303 | | | |
| | d4 = 4.650 | N3 = 1.60311 | v3 = 60.74 |
| r5 = 109.947 | | | |
| | d5 = 1.500~18.054~32.384 | | |
| r6* = 109.947 | | | |
| | d6 = 1.3 | N4 = 1.76683 | v4 = 49.47 |
| r7 = 14.774 | | | |
| | d7 = 4.500 | | |
| r8 = −32.796 | | | |
| | d8 = 0.900 | N5 = 1.75450 | v5 = 51.57 |
| r9 = 28.512 | | | |
| | d9 = 0.080 | | |
| r10 = 23.140 | | | |
| | d10 = 2.950 | N6 = 1.83350 | v6 = 21.00 |
| r11 = −104.975 | | | |
| | d11 = 0.600 | | |
| r12 = −62.052 | | | |
| | d12 = 0.800 | N7 = 1.69680 | v7 = 56.47 |
| r13 = 51.335 | | | |
| | d13 = 15.741~7.622~1.500 | | |
| r14 = ∞ (diaphragm) | | | |
| | d14 = 0.500 | | |
| r15 = 18.507 | | | |
| | d15 = 3.850 | N8 = 1.51742 | v8 = 52.15 |
| r16 = −56.171 | | | |
| | d16 = 0.080 | | |
| r17 = 18.468 | | | |
| | d17 = 3.250 | N9 = 1.48749 | v9 = 70.44 |
| r18 = −360.023 | | | |
| | d18 = 1.650 | | |
| r19 = −26.148 | | | |
| | d19 = 0.900 | N10 = 1.84666 | v10 = 23.82 |
| r20 = 58.214 | d20 = 6.550~3.307~0.700 | | |
| r21 = 16.626 | | | |
| | d21 = 4.550 | N11 = 1.51742 | v11 = 52.15 |
| r22 = −24.842 | | | |
| | d22 = 3.350 | | |
| r23* = −19.913 | | | |
| | d23 = 1.300 | N12 = 1.76683 | v12 = 49.47 |
| r24* = 1607.252 | | | |
| | d24 = 0.950 | | |
| r25 = 222.986 | | | |
| | d25 = 1.250 | N13 = 1.67339 | v13 = 29.25 |
| r26 = −85.731 | d26 = 1.731~20.594~35.822 | | |
| r27 = ∞ | | | |
| | d27 = 1.000 | N14 = 1.48749 | v14 = 42.83 |
| r28 = 43.735 | | | |
| | d28 = 0.100 | | |
| r29 = 22.026 | | | |
| | d29 = 5.271 | N15 = 1.85000 | v15 = 64.20 |
| r30 = 160.225 | | | |
| | d30 = 0.597 | | |
| r31 = 66.443 | | | |
| | d31 = 4.062 | N16 = 1.80792 | |
| r32 = −51.261 | | | |
| | d32 = 0.010 | N17 = 1.51400 | |
| r33 = −51.261 | | | |
| | d33 = 1.500 | N18 = 1.71846 | |
| r34 = 15.933 | | | |
| | d34 = 1.733 | | |
| r35 = 21.331 | | | |

-continued

| Embodiment 3 | | |
|---|---|---|
| | d35 = 2.726 | N19 = 1.75450 |
| r36* = 50.727 | | |
| | d36 = 2.097 | |
| r37 = ∞ | | |
| | d37 = 3.200 | N20 = 1.51680 |
| r38 = ∞ | | |

[Aspherical coefficient of 6th surface (r6)]

$\epsilon = 0.10000 \times 10$
$A4 = -0.29128 \times 10^{-6}$
$A6 = -0.53706 \times 10^{-7}$
$A8 = 0.71320 \times 10^{-9}$
$A10 = -0.37618 \times 10^{-11}$
$A12 = 0.57958 \times 10^{-14}$

[Aspherical coefficient of 23th surface (r23)]

$\epsilon = 0.10000 \times 10$
$A4 = 0.19235 \times 10^{-4}$
$A6 = -0.43123 \times 10^{-6}$
$A8 = 0.66528 \times 10^{-8}$
$A10 = -0.11019 \times 10^{-9}$
$A12 = -0.35292 \times 10^{-12}$

[Aspherical coefficient of 24th surface (r24)]

$\epsilon = 0.10000 \times 10$
$A4 = 0.11942 \times 10^{-3}$
$A6 = -0.11184 \times 10^{-6}$
$A8 = 0.44019 \times 10^{-8}$
$A10 = -0.31761 \times 10^{-10}$
$A12 = -0.77476 \times 10^{-12}$

[Aspherical coefficient of 36th surface (r36)]

$\epsilon = 0.10000 \times 10$
$A4 = 0.23868 \times 10^{-4}$
$A6 = -0.16593 \times 10^{-6}$
$A8 = 0.33251 \times 10^{-8}$ FIGS. 4 through 6 are aberration diagrams at infinity corresponding to the first through third embodiments, respectively, and in each diagram the top level shows the wide angle end (W), the middle level shoes the intermediate focal length (M), and the bottom level shows the telephoto end (T). In the spherical aberration diagrams, the solid line d represents the d-line, the dashed line (sc) represents the sine condition. In the aspherical aberration diagrams, the solid line DS and the dashed line DM represent the astigmatism of the sagittal surface and the meridional surface, respectively. Examples 1 through 3 satisfy conditional equations (1) through (8). The table below shows values which satisfy conditional equation (1) through (8).

TABLE 1

|  | EMBODIMENT 1 | EMBODIMENT 2 | EMBODIMENT 3 |
|---|---|---|---|
| (rP1 − rP2)/(rP1 + rP2) | −1.16 | −1.16 | −0.76 |
| φP/φs | 3.05 | 3.05 | 2.12 |
| (rN1 − rN2)/(rN1 + rN2) | 1.11 | 1.11 | 1.90 |
| φN/φs | −3.47 | −3.47 | −3.73 |
| βs | 0.655 | 0.655 | 0.655 |
| fs(1 − βs)/Ys | 2.43 | 2.43 | 2.25 |
| fs/Ys | 7.04 | 7.04 | 6.51 |
| EinW/Ys (Wide Angle end) | 4.96 | 4.95 | 5.36 |
| EinM/Ys (Middle) | 5.73 | 5.88 | 6.80 |
| EinT/Ys (Telephoto end) | 6.77 | 6.30 | 8.08 |

Values which satisfy conditional equation (9) are shown below. Y is the maximum image height of the aspherical surface.

TABLE 2

(Embodiment 1,2)

| HEIGHT | (X−X0)/(N'−N) |
|---|---|
| 0.00 Y | −0.00000 |
| 0.20 Y | −0.00043 |
| 0.40 Y | −0.00602 |
| 0.60 Y | −0.02716 |
| 0.80 Y | −0.10002 |
| 1.00 Y | −0.40911 |

TABLE 3

(Embodiment 3)

| HEIGHT | (X−X0)/(N'−N) |
|---|---|
| 0.00 Y | −0.00000 |
| 0.20 Y | −0.00045 |
| 0.40 Y | −0.00682 |
| 0.60 Y | −0.03450 |
| 0.80 Y | −0.12894 |
| 1.00 Y | −0.46124 |

The optical surfaces of the optical systems of the previously described embodiments are all surfaces utilizing a deflection action of the light rays via refraction by surfaces having different refractive indices, but the present invention is not limited to this arrangement inasmuch as lenses using a deflection action of rays via diffraction at predetermined parameters and optical surfaces of a refraction/diffraction hybrid type also may be used insofar as such surfaces are included within the essential scope of the present invention.

Although the present invention has been fully described by way of examples with reference to the accompanying drawings, it is to be noted that various changes and modification will be apparent to those skilled in the art. For instance, the invention has been described with reference to photoelectric imaging devices such as CCDs. However, the invention is useful for other imaging media, such any size or type of electronic imaging devices or chemical imaging devices or films. Therefore, unless otherwise such changes and modifications depart from the scope of the present invention, they should be construed as being included therein.

What is claimed is:

1. An image taking optical system comprising:
   a main optical system for forming an object image; and
   a reduction optical system including a plurality of lenses for reduction an image without re-forming the image formed by the main optical system,
   wherein the lens having the strongest positive optical power within the reduction optical system satisfies the following conditions:

$-2.5 < (rP1-rP2)/(rP1+rP2) < -0.3$, $1.2 < \phi P/\phi s < 5.0$, and wherein the lens having the strongest negative power within the reduction optical system satisfies conditional equations;

$0.65 < (rN1-rN2)/(rN1+rN2) < 3.0$ $-5.5 < \phi N/\phi s < -1.5$ where rP1 represents the radius of curvature on the object side of the positive lens, and rP2 represents the radius of curvature on the image side of the positive lens, rN1 represents the radius of curvature on the object side of the negative lens, and rN2 represents the radius of curvature on the image side of the negative lens, φP represents the optical power of the positive lens, φN represents the optical power of the negative lens and φs represents the optical power of the total system of the reduction optical system.

2. An image taking optical system according to claim 1, wherein said reduction optical system satisfies the following conditional equation:

$0.4 < \beta s < 0.9$ where βs represents the lateral magnification of the reduction optical system.

3. An image taking optical system according to claim 1, wherein said reduction optical system satisfies the following conditional equation:

$1.2 < fs(1-\beta s)/Ys < 4.0$, where fs represents the focal length $(=1/\phi s)$ of the reduction optical system, φs represents the lateral magnification of the reduction optical system, and Ys represents the maximum image height of the photographic lens and the reduction optical system.

4. An image taking optical system according to claim 1, wherein said reduction optical system satisfies the following conditional equation:

3.0<fs/Ys<11.0, where fs represents the focal length (=1/$\phi$s) of the reduction optical system, Ys represents the maximum image height of the photographic lens and the reduction optical system, and $\beta$s represents the lateral magnification of the reduction optical system.

5. An image taking optical system according to claim 1, wherein said reduction optical system satisfies the following conditional equation:

3.5<Ein/Ys<10.5 where Ein represents the distance from the exit pupil position of the main optical system to the first surface of the reduction optical system, and Ys represents the maximum image height of the photographic lens and the reduction optical system.

6. An image taking optical system according to claim 1, wherein, when an aspherical surface is used in the reduction optical system said reduction optical system satisfies the following conditional equation:

−0.65<(X−X0) /(N'−N)<0, where X represents the displacement in the optical axis direction at height Y of the effective optical path diameter expressed in equation (a) below, X0 represents the displacement in the optical axis direction at height Y of the effective optical path diameter expressed by equation (b) below, N' represents the refractive index of the aspherical surface on the image side, and N represents the refractive index of the aspherical surface on the object side, and wherein the equations expressing the surface shape of the aspherical surfaces are defined below:

X=X0+$\Sigma$Ai Y$^2$ (a)

Xo=CY$^2$/{1+(1−$\epsilon$C$^2$Y$^2$)$^{1/2}$} (b)

where X represents the displacement from a reference surface in the optical axis direction, Y represents the height in a direction perpendicular to the optical axis, C represents the paraxial curvature, $\epsilon$ represents the secondary curvature parameter, and Ai represents the aspherical coefficient of the i order.

7. An image taking optical system according to claim 1, wherein said reduction optical unit comprises a low-pass filter.

8. An image taking optical system according to claim 1, wherein said main optical system unit is a zoom lens comprising sequentially from the object side a first lens element and a second lens element, wherein the first lens element moves initially to the image side, and then moves again to the object side when zooming from the wide angle end to the telephoto end, and the second lens element moves simply to the object side when zooming from the wide angle end to the telephoto end.

9. An image taking optical system according to claim 1, wherein said main optical system unit is a zoom lens comprising sequentially from the object side a first lens element, a second lens element, a third lens element, and a fourth lens element, and all lens elements move simply to the object side when zooming from the wide angle side to the telephoto side.

10. An image taking optical system according to claim 1, wherein said main optical system unit is a zoom lens consisting essentially of sequentially from the object side a first lens element, a second lens element, a third lens element, and a fourth lens element, and all lens elements move simply to the object when zooming from the wide angle side to the telephoto side.

11. A camera body comprising:
a reduction optical system according to claim 1; and
an imaging medium.

12. A digital camera comprising:
an image taking lens system;
a reduction optical system according to claim 1; and
an imaging medium.

13. A camera according to claim 12, further comprising an optical low pass filter.

14. A reduction optical system for reducing an image without re-forming the image formed by a main optical system, said reduction optical system including a plurality of lenses,
wherein the lens having the strongest positive optical power within the reduction optical system satisfies the following condition:

−2.5<(rP1−rP2)/(rP1+rP2)<−0.3, where rP1 represents the radius of curvature on the object side of the positive lens, and rP2 represents the radius of curvature on the image side of the positive lens, and
wherein said lens having the strongest positive power within the reduction optical system satisfies the following condition:

1.2<$\phi$P/$\phi$s<5.0, where $\phi$P represents the optical power of the positive lens, and $\phi$s represents the optical power of the total system of the reduction optical system.

15. A reduction optical system according to claim 14, wherein the lens having the strongest negative power in the reduction optical system satisfies conditional equation:

0.65<(rN1−rN2)/(rN1+rN2)<3.0 where rN1 represents the radius of curvature on the object side of the negative lens, and rN2 represents the radius of curvature on the image side of the negative lens.

16. A reduction optical system according to claim 14, wherein said lens having the strongest negative optical power in the reduction optical system satisfies the following conditional equation:

−1.5<$\phi$N/$\phi$s<5.5 where $\phi$N represents the optical power of the negative lens, and $\phi$s represents the optical power of the total system of the reduction optical system.

17. An image taking optical system comprising:
a main optical system for forming an object image; and
a reduction optical system including a plurality of lenses for reducing an image without re-forming the image formed by the main optical system,
wherein the lens having the strongest positive optical power within the reduction optical system satisfies the following condition:

−2.5<(rP1−rP2)/(rP1+rP2)<−0.3, where rP1 represents the radius of curvature on the object side of the positive lens, and rP2 represents the radius of curvature on the image side of the positive lens, wherein said reduction optical unit comprises sequentially from an object side,
a cemented lens having a biconvex lens and a biconcave lens, and
a positive meniscus lens having a convex surface on the object side.

18. An image taking optical system comprising:
a main optical system for forming an object image; and
a reduction optical system including a plurality of lenses for reducing an image without re-forming the image formed by the main optical system,
wherein the lens having the strongest positive optical power within the reduction optical system satisfies the following condition:

$$-2.5 < (rP1-rP2)/(rP1+rP2) < -0.3,$$

where rP1 represents the radius of curvature on the object side of the positive lens, and rP2 represents the radius of curvature on the image side of the positive lens, and wherein said reduction optical unit comprises sequentially from an object side, a planoconcave lens having a concave surface on the image side, a positive meniscus lens having a convex surface on the object side, a cemented lens having a biconvex lens and a biconcave lens, and a positive meniscus lens having a convex surface on the object side.

* * * * *